United States Patent [19]

Labonte et al.

[11] Patent Number: 5,828,672
[45] Date of Patent: Oct. 27, 1998

[54] ESTIMATION OF RADIO CHANNEL BIT ERROR RATE IN A DIGITAL RADIO TELECOMMUNICATION NETWORK

[75] Inventors: Sylvain Labonte, St-Bruno de Montarville; Eric Turcotte, Verdun, both of Canada

[73] Assignee: Telefonaktiebolaget LM Ericsson (publ), Stockholm, Sweden

[21] Appl. No.: 846,630

[22] Filed: Apr. 30, 1997

[51] Int. Cl.⁶ .................................................... G06F 11/00
[52] U.S. Cl. ........................ 371/5.5; 371/5.1; 370/333; 370/252
[58] Field of Search ............................. 371/5.5, 5.1, 28; 370/333, 252

[56] References Cited

U.S. PATENT DOCUMENTS

| 5,402,447 | 3/1995 | Roney, IV | 375/340 |
| 5,406,562 | 4/1995 | Roney, IV | 371/5.1 |
| 5,418,789 | 5/1995 | Gersbach et al. | 371/5.2 |
| 5,701,294 | 12/1997 | Ward et al. | 370/252 |

FOREIGN PATENT DOCUMENTS

2232854  12/1990  United Kingdom .

Primary Examiner—Phung M. Chung
Attorney, Agent, or Firm—Steven W. Smith

[57] ABSTRACT

A system for determining when a radio telecommunications network should switch between a first grade of service and a second grade of service based upon a highly accurate and reliable estimate of the bit error rate (BER). The system estimates the BER on an uplink and a downlink on a user channel, and determines whether the BER on the uplink and the downlink on the user channel are below a first set of thresholds. The system then measures the residual BER (RBER) and the frame erasure rate (FER) on the voice channel uplink, and determines whether the downlink BER, the uplink RBER, and the uplink FER are lower than a second set of thresholds. If lower, the system sends and receives a data message on a Fast Associated Control Channel (FACCH). The system obtains a highly accurate estimate of the BER on a downlink on the FACCH channel, and reports the downlink BER in a message on the FACCH channel uplink. The system then estimates the BER on the FACCH channel uplink. Finally, the system switches the radio telecommunications network from the first grade of service to the second grade of service in response to determining that the uplink and downlink BER on the FACCH channel are below a third set of thresholds.

2 Claims, 6 Drawing Sheets

ESTIMATION OF RADIO CHANNEL BIT ERROR RATE IN A DIGITAL RADIO TELECOMMUNICATION NETWORK

BACKGROUND OF THE INVENTION

1. Technical Field of the Invention

This invention relates to radio telecommunication systems and, more particularly, to a system and method of estimating radio channel bit error rate in a digital radio telecommunications network.

2. Description of Related Art

In digital radio telecommunications networks, the quality of the transmitted signal is often expressed in terms of how many of the received bits are corrupted, leading to the expression Bit Error Rate (BER). The BER indicates how many of the total number of bits are wrongly detected.

With the introduction of data services in radio telecommunications networks, systems that provide two grades of service are being developed. A high grade of service utilizes high level modulation to provide higher service quality for data or improved voice services. A lower grade of service utilizes low level modulation to provide service quality which is adequate for traditional voice applications. A system and method of switching between one grade of service and the other is needed. Such a system must identify which level of service is being provided, assess the adequacy of the provided service, and if the service is not adequate, perform a switch between the two. In order to accomplish these objectives, a more accurate method of determining the BER is needed.

Although there are no known prior art teachings of a solution to the aforementioned deficiency and shortcoming such as that disclosed herein, U.K. Patent Application Number GB 2,232,854 A (GEC-Marconi), U.S. Pat. No. 5,418,789 (Gersbach), and U.S. Pat. No. 5,406,562 (Roney) discuss subject matter that bears some relation to matters discussed herein. The GEC-Marconi patent discloses a method of assessing the quality of a data channel based on the processing of soft decision demodulation information. The BER may be determined more quickly because sampling time is reduced due to the use of soft decisions within a known band of levels rather than hard decisions which require longer sampling time. The GEC-Marconi patent, however, does not teach or suggest a system or method of determining the BER with such accuracy and reliability that it can be used to determine when a radio telecommunications network should switch from a low grade of service to a high grade of service.

The Gersbach patent discloses a system and method for rapidly estimating the bit error rate of a data signal which has been reconstructed from a received data signal. A bit error rate calculator is integrated with a nearly instantaneous bit error rate estimator which utilizes timing and amplitude degradation information. The Gersbach patent, however, does not teach or suggest a system or method of determining the BER with such accuracy and reliability that it can be used to determine when a radio telecommunications network should switch from a low grade of service to a high grade of service.

The Roney patent discloses a BER estimation process which receives encoded data over a channel, decodes the data, and estimates the number of errors induced by the channel. Roney discloses a method of estimating the BER on a Fast Associated Control Channel (FACCH) as well as the BER on the user channel. The two BER estimates are compared, and the difference is utilized to determine whether the received data is convolutionally encoded user information or a FACCH message. The Roney patent, however, does not teach or suggest a system or method of determining when a radio telecommunications network should switch between one grade of service and another based upon a highly accurate and reliable estimate of the BER.

Review of each of the foregoing references reveals no disclosure or suggestion of a system or method such as that described and claimed herein.

In order to overcome the disadvantage of existing solutions, it would be advantageous to have a system and method of determining when a radio telecommunications network should switch between one grade of service and another based upon a highly accurate and reliable estimate of the BER. The present invention provides such a system and method.

SUMMARY OF THE INVENTION

In one aspect, the present invention is a system for determining when a radio telecommunications network should switch between a first grade of service and a second grade of service based upon a highly accurate and reliable estimate of the bit error rate (BER). The system includes means for estimating the BER on an uplink and a downlink on a user channel, and means for determining whether the BER on the uplink and the downlink on the user channel are below a first threshold. The system also includes means for sending and receiving a data message on a Fast Associated Control Channel (FACCH) in response to determining that the BER on the uplink and the downlink on the user channel are below the first threshold. The system also includes means for estimating the BER on an uplink and a downlink on the FACCH channel, means for estimating a residual bit error rate (RBER) on the uplink on the FACCH channel, and means for estimating a frame erasure rate (FER) on the uplink on the FACCH channel. The system then determines whether the BER on the downlink on the FACCH channel is below a second threshold, whether the RBER on the uplink is below a third threshold, and whether the FER on the uplink is equal to zero. If all three conditions are met, the system switches the radio telecommunications network from the first grade of service to the second grade of service.

In another aspect, the present invention is a method of determining when a radio telecommunications network should switch between a first grade of service and a second grade of service based upon a highly accurate and reliable estimate of the bit error rate (BER). The method begins by estimating the BER on an uplink and a downlink on a user channel, and determining whether the BER on the uplink and the downlink on the user channel are below a first threshold. The method then sends and receives a data message on a Fast Associated Control Channel (FACCH) in response to determining that the BER on the uplink and the downlink on the user channel are below the first threshold. This is followed by estimating the BER on an uplink and a downlink on the FACCH channel, estimating a residual bit error rate (RBER) on an uplink on the FACCH channel, and estimating a frame erasure rate (FER) on the uplink on the FACCH channel. The method then determines whether the BER on the downlink on the FACCH channel is below a second threshold, whether the RBER on the uplink is below a third threshold, and whether the FER on the uplink is equal to zero. This is followed by switching the radio telecommunications network from said first grade of service to said second grade of service in response to determining that all three conditions are met.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

When a radio telecommunications network is operating in the high grade of service, and it is detected that the radio channel quality is degrading, then the network must switch back to the lower grade of service to maintain voice quality. To detect that voice quality is degrading with the speech coder on the high rate is relatively simple. When a high bit error rate (BER) is measured, and it exceeds a predetermined threshold, then the system switches the network back to the lower grade of service.

Changing from the lower grade of service to the higher grade is more complicated. The network may be operating in a mode that is less demanding in terms of radio channel conditions, and the network, therefore, is already offering a good radio channel quality (i.e., low BER). The system must decide at that time whether the radio channel conditions are good enough to support the higher grade of service in which there is a higher level modulation, higher rate voice coder, etc. Thus, the system must assess the quality of a good channel which has a low BER. Therefore, a very accurate BER measurement is required.

There are advantages in changing to the higher grade of service. The high rate modulation supports the use of a high rate voice coder. The high rate voice coder inherently is better quality than a low rate voice coder, and provides excellent service. However, if the channel conditions degrade, the voice quality degrades very rapidly when utilizing the high rate voice coder. In those cases, the system changes to low level modulation with low rate voice coder which is more robust.

Figure 1:
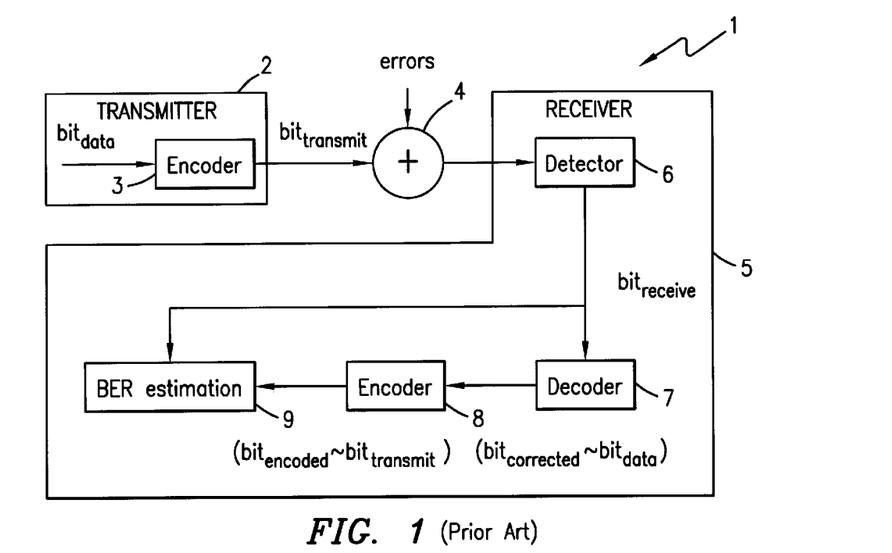
FIG. 1 (Prior Art) is a simplified functional block diagram illustrating the functions performed in an existing method of estimating the bit error rate (BER) in a radio telecommunications network.

Today's techniques for measuring BER are not sufficient to identify the low BER threshold that triggers the system to change to high grade service. FIG. 1 is a simplified functional block diagram illustrating the functions performed in an existing method of estimating the BER in a radio telecommunications network 1. A transmitter 2 includes an encoder 3 which takes bits of data ($bit_{data}$) and adds redundancy bits to form a transmitted bit stream ($bit_{transmit}$). As the encoded $bit_{transmit}$ is transmitted over the user channel of a digital traffic channel (DTC) 4, errors are incurred. A receiver 5 includes a detector 6, a decoder 7, and an encoder 8 which is identical to the transmitter encoder 3. The detector 6 detects the received bit stream ($bit_{receive}$) which includes both correct and incorrect bits.

The $bit_{receive}$ is decoded by the decoder 7 in a process in which error correction is performed, and the redundancy bits are removed, to produce a corrected bit stream ($bit_{corrected}$). The $bit_{corrected}$ is approximately the same as the $bit_{data}$, with the exception of residual errors that could not be recovered. If it is assumed that the $bit_{corrected}$ is equal to the $bit_{data}$, and the $bit_{corrected}$ are applied through the encoder 8 (which is identical to the transmitter encoder 3), then the output ($bit_{encoded}$) should be equal to $bit_{transmit}$. However, because of the residual errors in the $bit_{corrected}$, they are not exactly equal. The $bit_{encoded}$ is then sent to a BER estimator 9 where $bit_{encoded}$ is compared to $bit_{receive}$ to determine the BER. Thus, an estimate of the bits transmitted (i.e., $bit_{encoded}$) is compared with the bits received to directly determine BER. However, this calculation is inherently flawed because the residual errors in the $bit_{corrected}$ make the estimate of $bit_{transmit}$ inaccurate.

When the system identifies the BER as being low, this estimate must be accurate or else changing to the high modulation and high voice coder rate may result in a loss of voice quality rather than a gain. Therefore, it is critical that the system and method for determining the BER be accurate and reliable. The present invention provides a system and method by which very low BERs are accurately evaluated with a high level of confidence.

Figure 2:
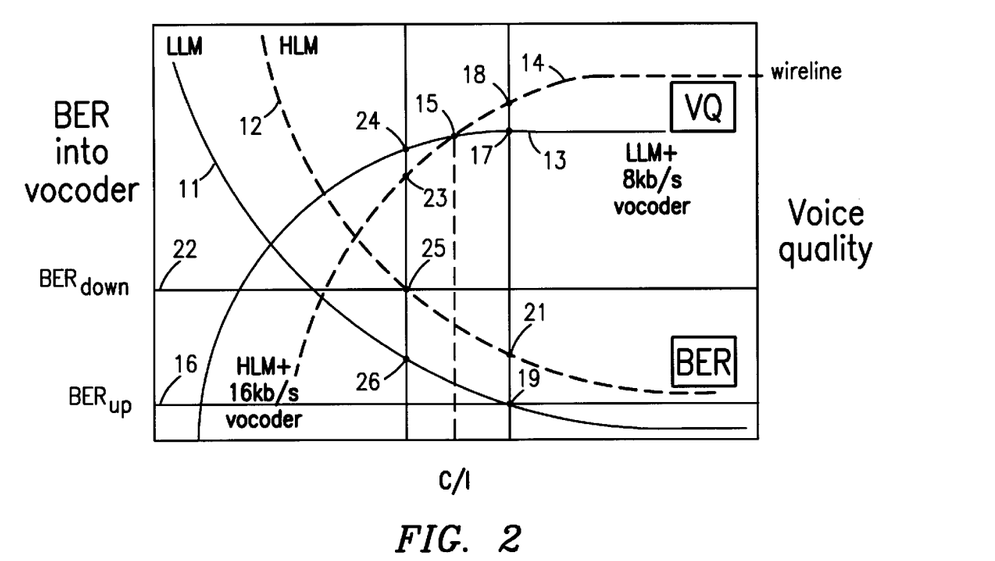
FIG. 2 is a graph of voice quality (VQ) and BER as a function of the carrier to interference (C/I) ratio for a high level modulation (HLM) scheme and a low level modulation (LLM) scheme in the preferred embodiment of the present invention.

FIG. 2 is a graph of voice quality (VQ) and bit error rate (BER) as a function of the carrier to interference (C/I) ratio for a high level modulation (HLM) scheme and a low level modulation (LLM) scheme in the preferred embodiment of the present invention. The C/I is directly related to the radio channel condition. That is, a high C/I indicates good radio channel conditions while a low C/I indicates poor radio channel conditions. The solid line 11 represents BER as a function of C/I for the low level modulation (LLM) scheme utilizing a 8 kb/s voice coder (vocoder). The dashed line 12 represents BER as a function of C/I for the high level modulation (HLM) scheme utilizing a 16 kb/s vocoder. The solid line 13 represents VQ as a function of C/I for the low level modulation (LLM) scheme utilizing a 8 kb/s voice coder (vocoder). The dashed line 14 represents VQ as a function of C/I for the high level modulation (HLM) scheme utilizing a 16 kb/s vocoder.

In very good channel conditions (i.e., high C/I), the voice quality for the high level modulation scheme is significantly better than the voice quality with the low level modulation. In poor channel conditions (i.e., low C/I), on the other hand, the voice quality for the low level modulation scheme is significantly better than the voice quality with the high level modulation. There is a crossover point at 15. For system management purposes, it is desirable to determine when the network should change to the high level modulation because the C/I is to the right of the crossover point 15, and when the network should change to the low level modulation because the C/I is to the left of the crossover point 15. Direct measurements of the C/I are difficult and may be unreliable. Therefore, this determination is made by measuring the bit error rate (BER).

The two curves 11 and 12 show the BER as a function of C/I. For any given C/I, the BER is higher for the high level modulation than it is for the low level modulation. The present invention measures BER. If the network is operating in low level modulation, and the BER falls below a threshold value ($BER_{up}$) 16, the system changes the network to the high level modulation. By changing to high level modulation, voice quality rises from point 17 to point 18 on the graph. BER also rises (from point 19 to point 21), but this rise is acceptable since voice quality is better even at the higher BER.

If the quality of the channel degrades (i.e., the C/I falls), the BER follows dashed line 12 to the left from point 21. When the BER rises above a threshold value ($BER_{down}$) 22, the system changes the network to the low level modulation. By changing to low level modulation, voice quality rises from point 23 to point 24 on the graph. At the same time, BER falls from point 25 to point 26.

Estimating the BER at $BER_{down}$ 22 is a relatively easy task because it is a high BER. The low BER at $BER_{up}$ 16 is difficult to measure because the system has to measure a large number of bits for each measured error. Existing procedures to measure BER are not capable of providing the degree of accuracy and reliability required for measuring BER at this level. The BER curve 11 is very flat at this point, and small errors in the BER measurement result in large differences in C/I estimates. These differences can impact greatly the decision to change from the low level modulation to the high level modulation.

The present invention evaluates the BER on a Fast Associated Control Channel (FACCH) rather than the user channel of the DTC. The DTC carries both voice bits and data bits, but not simultaneously. The voice bits are on the user channel and the data bits are on the FACCH channel. Each slot contains 260 bits. When voice bits are sent in the slot, the bits are encoded in a particular way. When data bits are sent (for example, when sending a FACCH message), these 260 bits are encoded in a different way. This encoding is described in more detail below. The encoding for data bits is more robust than the encoding for voice bits, therefore, error correction is more effective. Since error correction is more effective, the $bit_{encoded}$ (see FIG. 1) is a more accurate estimate of the bits transmitted. Therefore, when the $bit_{encoded}$ is compared to $bit_{receive}$ to determine the BER, the determination is more accurate on the FACCH channel.

Figure 3:
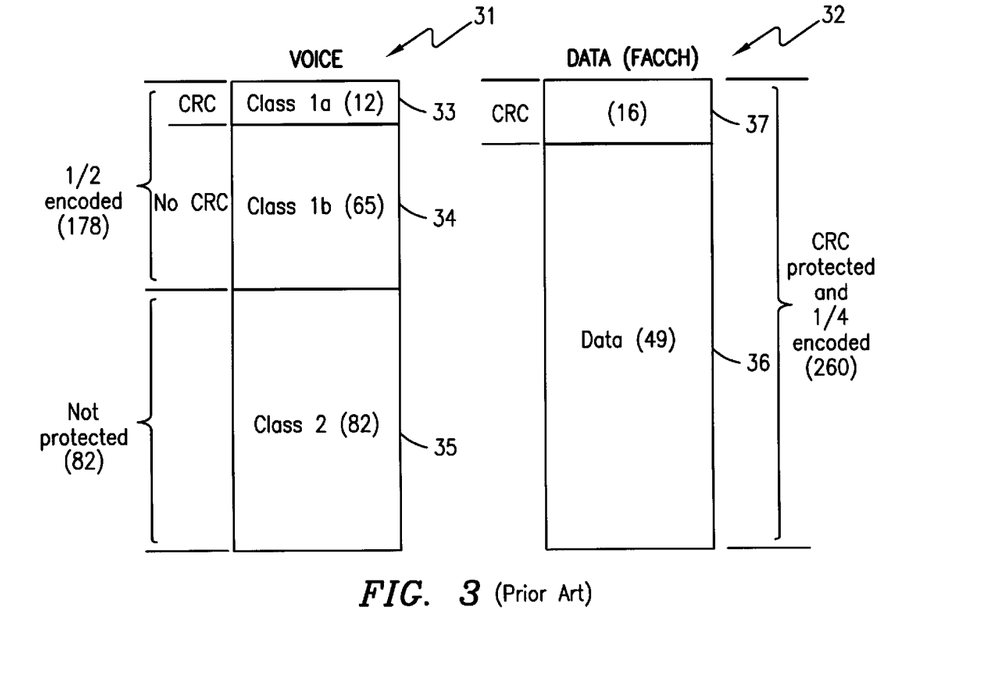
FIG. 3 (Prior Art) is an illustrative drawing illustrating the number of bits and classes of bits encoded in a speech transmission and in a Fast Associated Control Channel (FACCH) message transmission.

FIG. 3 is an illustrative drawing illustrating the number of bits and classes of bits encoded in a speech (voice) transmission frame 31 and in a FACCH message (data) transmission frame 32. For the speech frame, there are two classes of voice bits: Class 1 bits and Class 2 bits. There are 77 Class 1 bits. Twelve (12) Class 1a bits 33 have the cyclical redundancy check (CRC) error detection scheme applied to them, and 65 class 1b bits 34 do not. The 77 Class 1 bits (and 7 CRC bits) are protected with a one-to-two (1/2) coder (i.e., one redundancy bit is added for each voice bit). Thus, a total of 178 encoded Class 1 bits are transmitted. There are 82 Class 2 bits 35 which are not encoded (i.e., they are transmitted with no error protection at all). Thus, a total of 260 bits are transmitted.

The payload 36 of the FACCH message frame 32 is 49 bits in length. A 16-bit CRC 37 is added to the payload to increase the bits to 65. All 65 bits are encoded by a one-to-four (1/4) coder because for every bit that goes into the coder, four bits come out of it. The 65 bits multiplied by 4 equals 260 bits transmitted over the air. The CRC is an error detection technique while the encoding is error correction coding. Thus, the signal has a much greater amount of redundancy to the bit stream than voice.

The present invention, however, is intended for use with a voice channel, with voice bits on it. However, as noted above, the voice bits are less robustly encoded, therefore, they are more prone to errors, and the BER estimation on the user channel is not as accurate. However, BER estimation on the user channel is sufficient for continuous monitoring of the BER. Therefore, the present invention utilizes BER estimation on the user channel to monitor channel conditions until a more accurate estimation is required.

Figure 4:
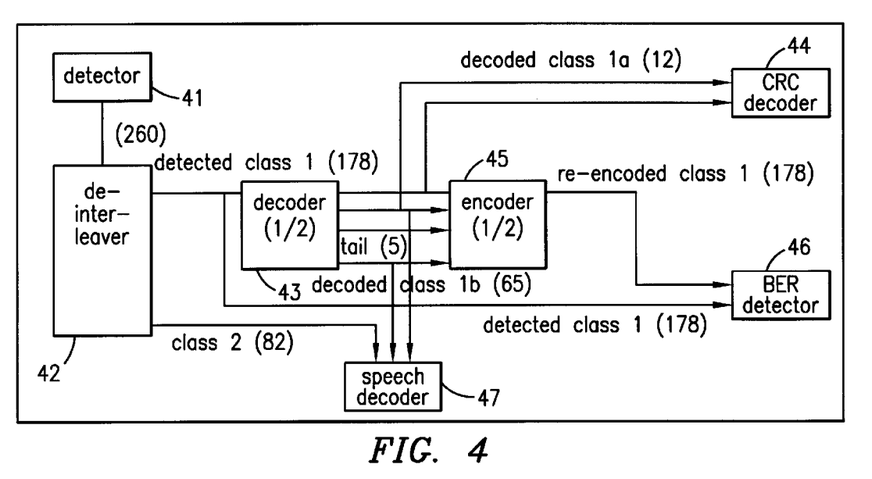
FIG. 4 is a functional block diagram illustrating the functions performed in the method of the present invention when estimating the BER for a speech transmission on the user channel.

FIG. 4 is a functional block diagram illustrating the functions performed in the method of the present invention when estimating the BER for a speech transmission on the user channel. The 260 bits are received at a receiver detector 41 and are passed to a de-interleaver 42 which separates class 1 bits and class 2 bits. When Class 1 bits are received, a 1/2 decoder 43 decodes them into 77 bits. Of those 77 Class 1 bits, only 12 Class 1a bits have the CRC error detection scheme applied to them. Thus, out of 159 voice bits (77 class 1 bits and 82 class 2 bits), the accuracy of only 12 bits is known. The decoded class 1a bits and the CRC are sent to a CRC decoder 44. If the CRC applied to those 12 Class 1a bits is good, then the frame is good. If there is a CRC discrepancy, then the frame is dropped by the CRC decoder 44 as a frame error. The frame erasure rate (FER) is measured over 26 frames, and is the ratio of the frames that did not pass the CRC check to the total number of frames.

The CRC process goes in parallel with the BER estimation process. BER is calculated on every received frame, whether the frame is rejected by the CRC decoder 44 or not. In other words, BER is calculated on all frames that were decoded—in the frames where the errors were all corrected by the system, and also in the frames where all the errors were not corrected by the system. In those frames where the errors are not corrected by the system, the bits are unreliable, and the BER that is calculated for those frames is not reliable.

The decoder removes the redundancy bits and produces a corrected bit stream which is sent to a 1/2 encoder 45 identical to the encoder utilized at the transmitter (not shown). The output, which approximates the bits transmitted, are passed to a BER detector 46 where they are compared with the detected class 1 bits. Class 2 bits are passed directly from the de-interleaver 42 to a speech decoder 47. Decoded class 1a bits and class 1b bits are also passed to the speech decoder 47 from the 1/2 decoder 43.

The residual BER is the BER calculated on only the frames that pass the CRC check. The present invention monitors the BER and the residual BER. Monitoring the residual BER and the frame erasure rate (FER) provides a better, more reliable estimate of the actual BER. The system monitors the residual BER in parallel with the FER because residual BER only indicates the BER on the accepted frames. It does not indicate how many frames were refused.

When channel conditions are good, the system makes an accurate BER estimation to determine whether the BER is at $BER_{up}$ 16 (FIG. 2). This is done by interrupting the voice on the user channel long enough to send a short FACCH message over the FACCH channel and estimate the BER. The FACCH message replaces voice for one or two frames while the system makes an accurate BER estimate. Then a reliable decision can be made whether to change to high level modulation. The FACCH message is sent on the downlink (i.e., from the base station to the mobile station) and orders the mobile station to report the number of bit errors in the FACCH message it received. The mobile station replies by sending a FACCH message containing the requested information (i.e., bit errors on the FACCH downlink) ($BE_{F\_DL}$). The base station receives the message from the mobile station and determines the bit errors on the FACCH uplink ($BE_{F\_UL}$).

Figure 5:
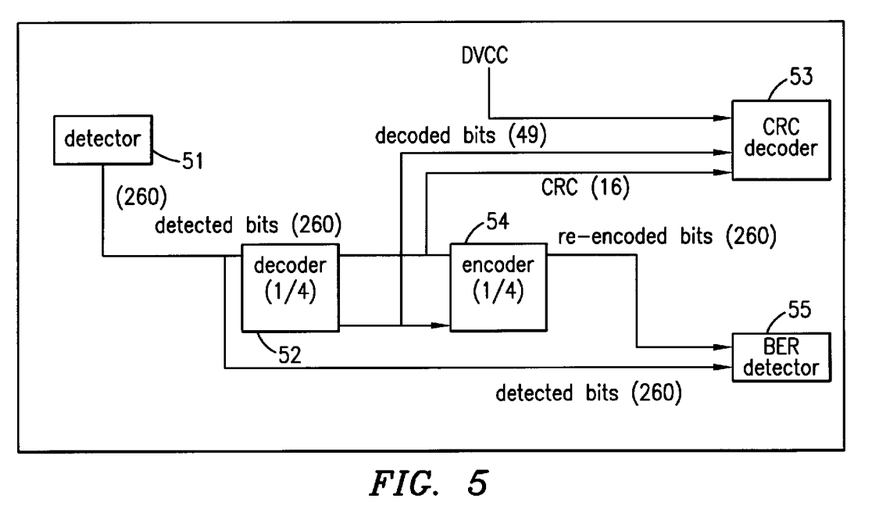
FIG. 5 is a functional block diagram illustrating the functions performed in the method of the present invention when estimating the BER during transmission of a FACCH message on the FACCH channel.

FIG. 5 is a functional block diagram illustrating the functions performed in the method of the present invention when estimating the BER during transmission of a Fast Associated Control Channel (FACCH) message on the FACCH channel. The 260 bits are received at a receiver detector 51. They are sent to a 1/4 decoder 52 which is matched to the encoder that was used at the transmitter (not shown). The output of the decoder 52 is a 16 bit CRC and 49 bits of data. A CRC decoder 53 checks the CRC, which is the error detection mechanism, and ascertains whether the CRC still matches the 49 bits, and whether there are errors left in the decoded bits. If there are errors detected, there is a frame error and the CRC decoder discards the frame because the coding/decoding scheme did not manage to prevent errors. In parallel with this, the 49 decoded bits and the 16 CRC bits are sent to a 1/4 encoder 54 identical to the one that was used in the transmitter, in order to regenerate the 260 transmitted bits. The regenerated bits and the detected bits are sent to a BER detector 55. By comparing the 260 bits that were detected and the 260 bits that were regenerated, the BER detector determines the BER. Thus, the BER comes from the BER detector 55, and the frame error rate or frame erasures come from the CRC decoder 53.

Figure 6A:
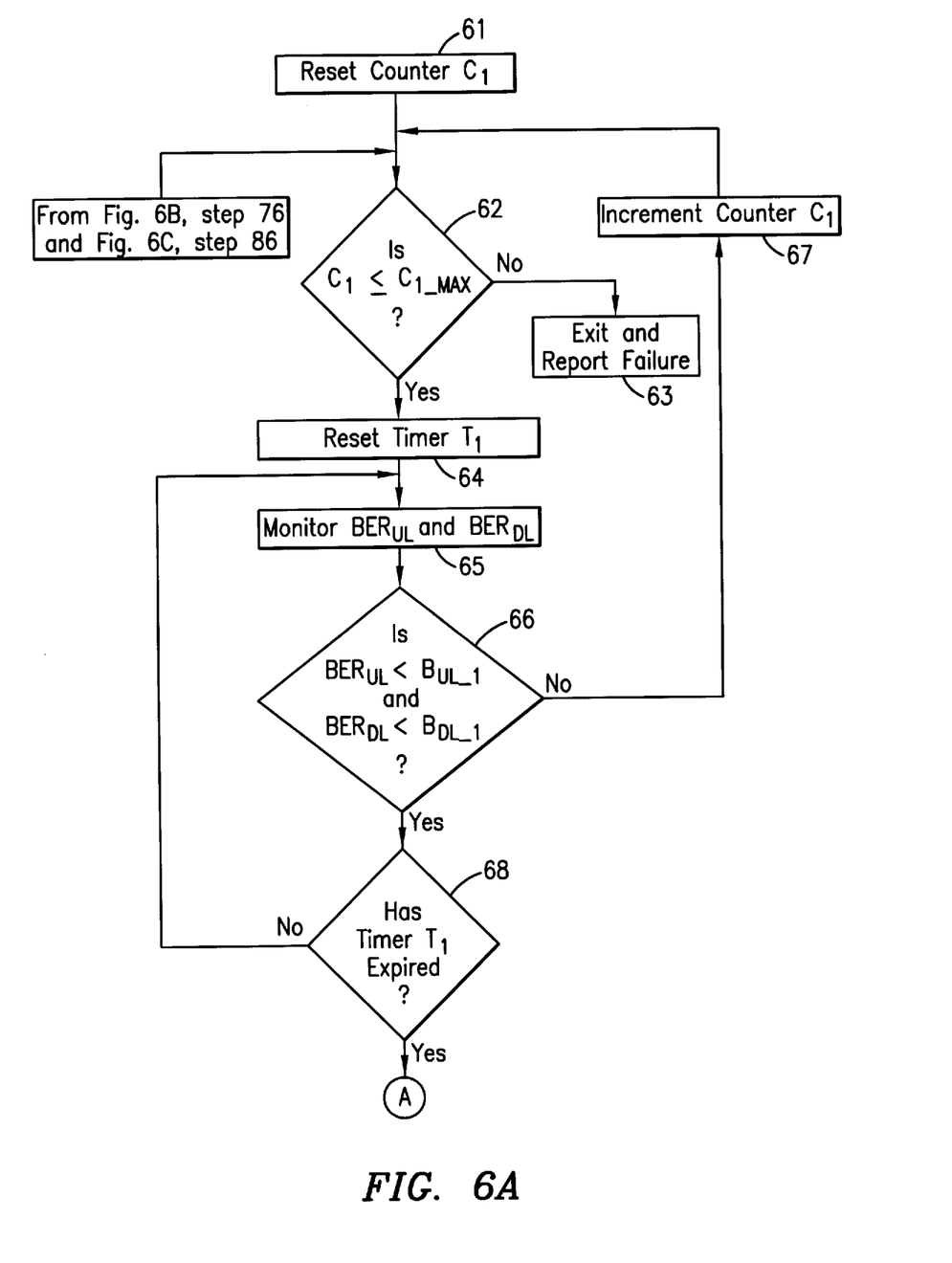
FIGS. 6A–6C are a flow chart illustrating the steps of the preferred embodiment of the present invention.
Figure 6B:
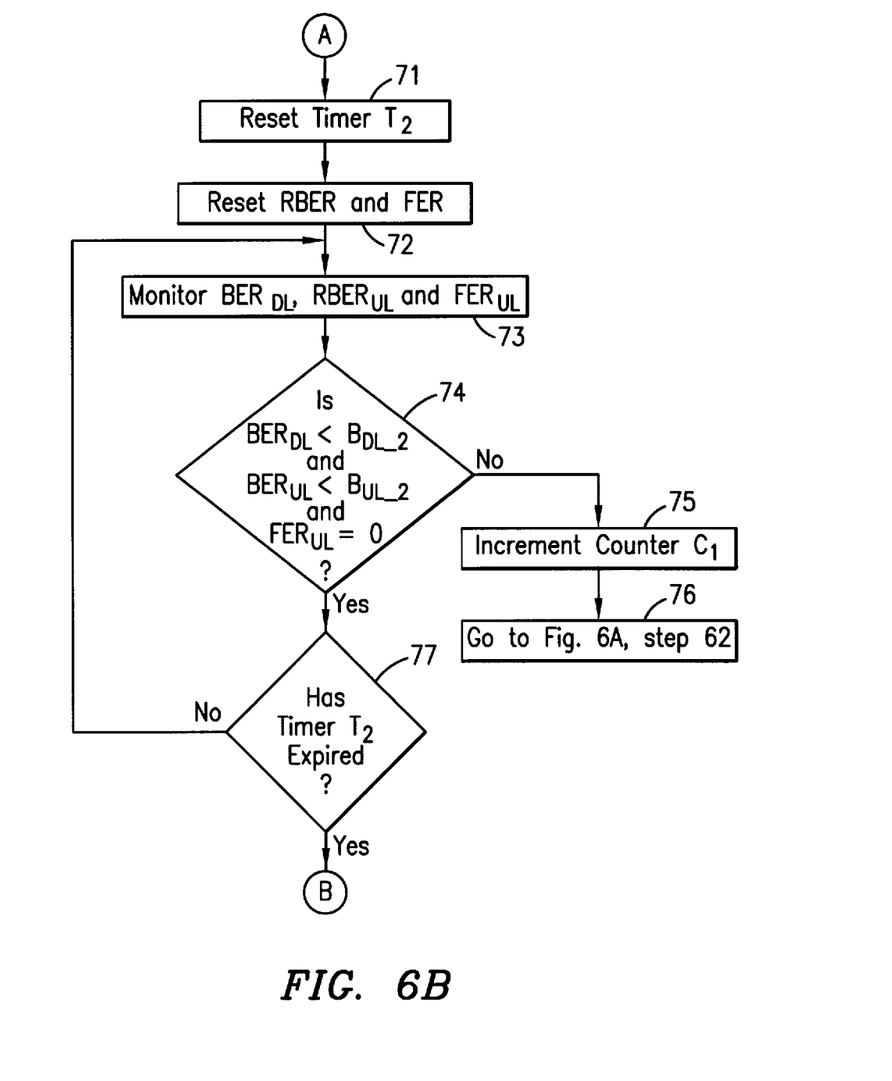
Figure 6C:
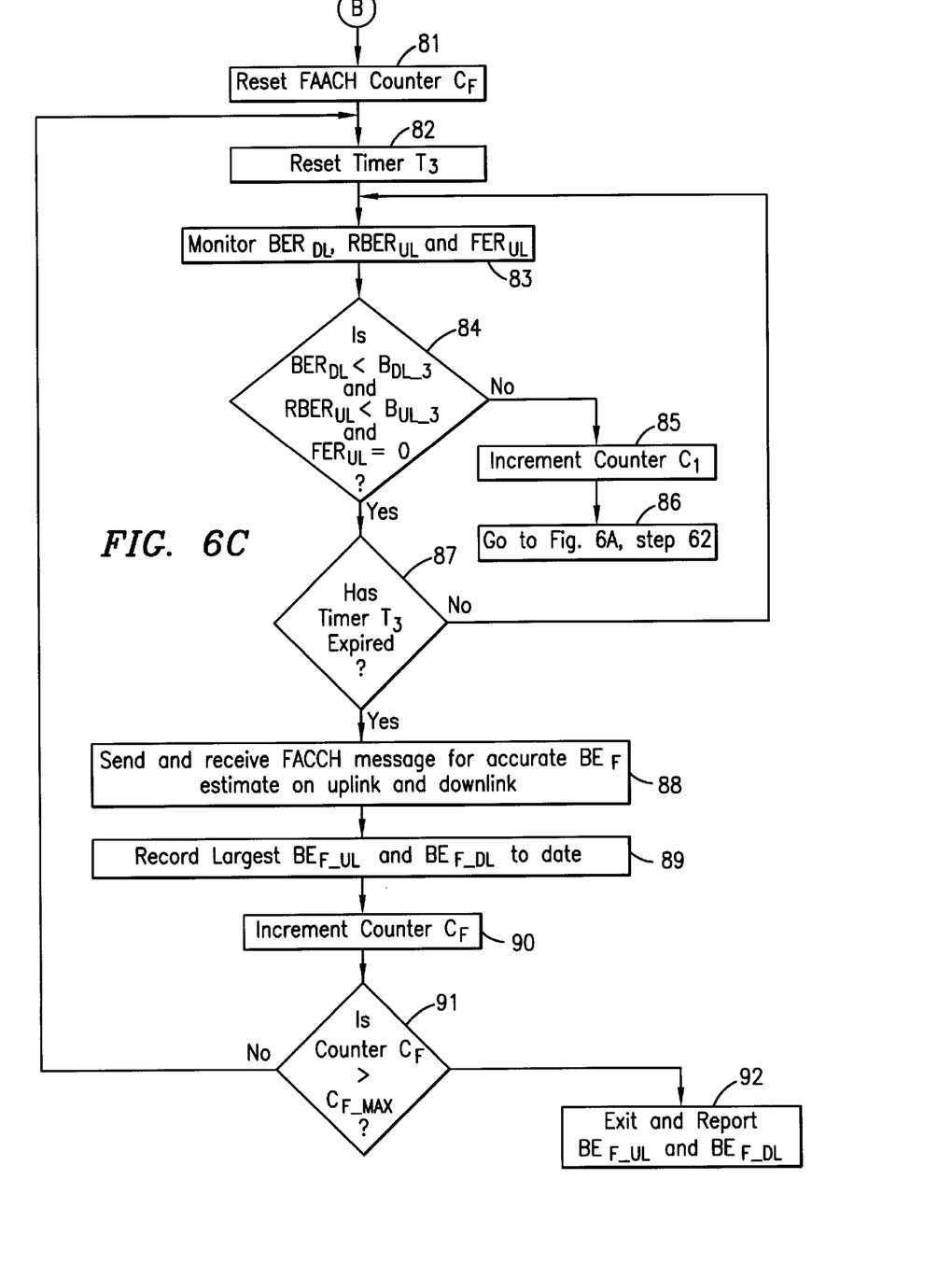

FIGS. 6A–6C are a flow chart illustrating the steps of the bit error rate estimation process of the preferred embodiment of the present invention. In general, there are three levels in the estimation process. On level 1, the process monitors the BER uplink and downlink on the voice channel with the existing method of estimating BER. When the BER uplink and downlink are estimated to be lower than predetermined thresholds for a specified period of time, then the process moves to level 2. On level 2, the process measures residual BER and the frame erasure rate (FER) on the uplink and if these measurements indicate that there are no errors in the system, then frames are not dropped. The process then moves to level 3. On level 3, a FACCH message replaces the voice and is sent over the downlink FACCH channel. An accurate estimate is then made of the number of bit errors on the downlink FACCH channel. The bit errors are then converted to a BER, and the downlink BER is reported by the mobile station in a FACCH uplink message on which the system evaluates the uplink BER.

Referring to FIG. 6A, the level 1 process monitors the BER uplink and downlink on the voice channel with the existing method of estimating BER. The process begins at step 61 where a counter $C_1$ is reset to zero (0). Counter $C_1$ counts the number of times that the procedure fails to measure a low BER at steps 66, 74, and 84. Counter $C_1$ counts up to $C_{1\_MAX}$, which may be set, for example, at a value of 2. At step 62, it is determined whether or not $C_1 \leq C_{1\_MAX}$. If $C_1$ is not less than or equal to $C_{1\_MAX}$, then the process moves to step 63 where the process exits and reports a failure. The failure may be reported by a code indicating that an accurate low BER value could not be determined. If, however, it is determined at step 62 that $C_1$ is less than or equal to $C_{1\_MAX}$, then the process moves to step 64 where a timer $T_1$ is reset to zero (0). Timer $T_1$ measures the time period over which the BER is monitored in level 1, and may be set to approximately 5 seconds.

The process then moves to step 65 where the process monitors the BER on the uplink ($BER_{UL}$) and the BER on the downlink ($BER_{DL}$). At step 66, it is determined whether or not $BER_{UL} < B_{UL\_1}$, and $BER_{DL} < B_{DL\_1}$. $B_{UL\_1}$ and $B_{DL\_1}$ are predetermined thresholds for BER on the uplink and downlink, respectively. If not, the process moves to step 67 where the counter $C_1$ is incremented. The process then returns to step 62. If yes at step 66, the process moves to step 68 where it is determined whether or not timer $T_1$ has expired. If not, the process returns to step 65 and continues to monitor $BER_{UL}$ and $BER_{DL}$. If, however, timer $T_1$ has expired, the process moves to step 71 in FIG. 6B.

Referring to FIG. 6B, the level 2 process measures residual BER (RBER) and the frame erasure rate (FER) on the uplink. At step 71, a timer $T_2$ is reset. Timer $T_2$ measures the time period over which the RBER and the FER are monitored in level 2, and may be set to approximately 5 seconds. At step 72, the RBER and the FER measurements are reset, and the process then monitors the BER on the downlink, and the RBER and FER on the uplink ($RBER_{UL}$ and $FER_{UL}$) at 73. The process then moves to step 74 where each of these measurements are compared to various thresholds. It is determined whether or not the $BER_{DL} < B_{DL\_2}$; $RBER_{UL} < B_{UL\_2}$; and $FER_{UL} = 0$. $B_{DL\_2}$ and $B_{UL\_2}$ are predetermined thresholds for BER on the uplink and downlink, respectively. If not, the process moves to step 75 where the counter $C_1$ is incremented. The process then moves to step 76 where the process returns to step 62 in FIG. 6A. If yes at step 74, the process moves to step 77 where it is determined whether or not timer $T_2$ has expired. If not, the process returns to step 73 and continues to monitor $BER_{DL}$, $RBER_{UL}$, and $FER_{UL}$. If, however, timer $T_2$ has expired, the process moves to step 81 in FIG. 6C.

Referring to FIG. 6C, the level 3 process makes an accurate estimate of the number of bit errors on the FACCH channel, converts the bit errors to a BER, and reports the BER by the mobile station. At step 81, a FACCH counter $C_F$ is reset to zero (0). The FACCH counter $C_F$ counts the number of times that FACCH messages are sent in level 3, up to a maximum predetermined limit of $C_{F\_MAX}$. At 82, a timer $T_3$ is reset to zero (0). Timer $T_3$ measures the time interval between FACCH messages in level 3, and may be set to expire at approximately 2 seconds. The process then moves to step 83 and monitors the $BER_{DL}$, $RBER_{UL}$, and $FER_{UL}$, in other words, the BER on the downlink, and the RBER and FER on the uplink. The process then moves to step 84 where each of these measurements are compared to various thresholds. It is determined whether or not the $BER_{DL} < B_{DL\_3}$; $RBER_{UL} < B_{UL\_3}$; and $FER_{UL} = 0$. If not, the process moves to step 85 where counter $C_1$ is incremented. The process then moves to step 86 where it returns to step 62 in FIG. 6A. If yes at step 84, the process moves to step 87 where it is determined whether or not timer $T_3$ has expired. If not, the process returns to step 83 and continues to monitor $BER_{DL}$, $RBER_{UL}$, and $FER_{UL}$. If, however, timer $T_3$ has expired, the process moves to step 88.

At step 88, the process sends and receives a FACCH message on the FACCH channel and makes an accurate estimate of the bit errors on the FACCH ($BE_F$) on the uplink and the downlink. The base station sends a message telling the mobile station to report the number of bit errors in the last FACCH message it received. The mobile station replies by sending a FACCH message containing the requested information (i.e., bit errors on the FACCH downlink) ($BE_{F\_DL}$). The base station receives the message from the mobile station and determines the bit errors on the FACCH uplink ($BE_{F\_UL}$). At step 89, the process records the largest $BE_{F\_UL}$ and the largest $BE_{F\_DL}$ to date.

The process then moves to step 90 and increments the FACCH counter $C_F$. At 91, the process determines whether or not the number of times that FACCH messages have been sent in level 3 is greater than the maximum predetermined limit of $C_{F\_MAX}$. If not, the process returns to step 82. If, however, $C_F > C_{F\_MAX}$, the process moves to step 92 and exits and reports the largest $BE_{F\_UL}$ and the largest $BE_{F\_DL}$ to date.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A system for determining when a radio telecommunications network should switch between a first grade of service and a second grade of service based upon a highly accurate and reliable estimate of the bit error rate (BER), said system comprising:

means for estimating the BER on an uplink and a downlink on a user channel;

means for determining whether the BER on the uplink and the downlink on the user channel are below a first threshold;

means for sending and receiving a data message on a Fast Associated Control Channel (FACCH) in response to determining that the BER on the uplink and the downlink on the user channel are below the first threshold;

means for estimating the BER on an uplink and a downlink on the FACCH channel;

means for estimating a residual bit error rate (RBER) on the uplink on the FACCH channel;

means for estimating a frame erasure rate (FER) on the uplink on the FACCH channel;

means for determining:
whether the BER on the downlink on the FACCH channel is below a second threshold;
whether the RBER on the uplink is below a third threshold; and
whether the FER on the uplink is equal to zero; and means for switching the radio telecommunications network from said first grade of service to said second grade of service in response to determining that the BER on the downlink on the FACCH channel is below a second threshold, the RBER on the uplink is below a third threshold, and the FER on the uplink is equal to zero.

2. A method of determining when a radio telecommunications network should switch between a first grade of service and a second grade of service based upon a highly accurate and reliable estimate of the bit error rate (BER), said method comprising the steps of:

estimating the BER on an uplink and a downlink on a user channel;

determining whether the BER on the uplink and the downlink on the user channel are below a first threshold;

sending and receiving a data message on a Fast Associated Control Channel (FACCH) in response to determining that the BER on the uplink and the downlink on the user channel are below the first threshold;

estimating the BER on an uplink and a downlink on the FACCH channel;

estimating a residual bit error rate (RBER) on an uplink on the FACCH channel;

estimating a frame erasure rate (FER) on the uplink on the FACCH channel;

determining whether the BER on the downlink on the FACCH channel is below a second threshold, whether the RBER on the uplink is below a third threshold, and whether the FER on the uplink is equal to zero; and switching the radio telecommunications network from said first grade of service to said second grade of service in response to determining that the BER on the downlink on the FACCH channel is below a second threshold, the RBER on the uplink is below a third threshold, and the FER on the uplink is equal to zero.

* * * * *